United States Patent
Kang et al.

(10) Patent No.: US 11,656,950 B2
(45) Date of Patent: May 23, 2023

(54) METHOD, ELECTRONIC DEVICE AND COMPUTER PROGRAM PRODUCT FOR STORAGE MANAGEMENT

(71) Applicant: EMC IP Holding Company LLC, Hopkinton, MA (US)

(72) Inventors: Jian Kang, Chengdu (CN); Chenglin Li, Chengdu (CN); Ruiyang Zhang, Chengdu (CN); Mingyi Luo, Chengdu (CN); Hongyuan Zeng, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 321 days.

(21) Appl. No.: 17/018,058

(22) Filed: Sep. 11, 2020

(65) Prior Publication Data

US 2021/0286680 A1   Sep. 16, 2021

(30) Foreign Application Priority Data

Mar. 13, 2020   (CN) .......................... 202010177767.7

(51) Int. Cl.
    *G06F 16/00*        (2019.01)
    *G06F 11/14*        (2006.01)
(52) U.S. Cl.
    CPC ...... *G06F 11/1458* (2013.01); *G06F 2201/84* (2013.01)
(58) Field of Classification Search
    CPC .......................... G06F 11/1458; G06F 2201/84

USPC .......................................................... 707/649
See application file for complete search history.

(56) References Cited

U.S. PATENT DOCUMENTS

| | | | |
|---|---|---|---|
| 8,225,059 B2 | 7/2012 | Nakamura et al. | |
| 8,706,833 B1 | 4/2014 | Bergant et al. | |
| 9,563,517 B1 | 2/2017 | Natanzon et al. | |
| 10,983,718 B2 * | 4/2021 | Wang | G06F 3/0671 |
| 10,992,768 B1 | 4/2021 | Bhatnagar et al. | |
| 2012/0011336 A1 * | 1/2012 | Saika | G06F 3/0641 |
| | | | 711/E12.103 |
| 2014/0108752 A1 * | 4/2014 | Brown | G06F 11/1458 |
| | | | 711/E12.103 |
| 2018/0352037 A1 * | 12/2018 | Shang | H04L 67/148 |

* cited by examiner

*Primary Examiner* — Monica M Pyo
(74) *Attorney, Agent, or Firm* — BainwoodHuang (57) ABSTRACT

Techniques involve: acquiring a first source snapshot for a source storage object stored in a source storage device; determining first difference data between the first source snapshot and the source storage object or a second source snapshot for the source storage object, creation time of the first source snapshot being associated with creation time of the second source snapshot; and sending the first difference data to a destination storage device to enable the destination storage device to create a first destination snapshot for a destination storage object stored in the destination storage device based on the first difference data. Such techniques can migrate snapshots more efficiently to improve storage management efficiency.

17 Claims, 5 Drawing Sheets

METHOD, ELECTRONIC DEVICE AND COMPUTER PROGRAM PRODUCT FOR STORAGE MANAGEMENT

CROSS-REFERENCE TO RELATED APPLICATION(S)

This application claims priority to Chinese Patent Application No. CN202010177767.7, on file at the China National Intellectual Property Administration (CNIPA), having a filing date of Mar. 13, 2020 and having "METHOD, ELECTRONIC DEVICE AND COMPUTER PROGRAM PRODUCT FOR STORAGE MANAGEMENT" as a title, the contents and teachings of which are herein incorporated by reference in their entirety.

TECHNICAL FIELD

Embodiments of the present disclosure generally relate to a computer technology, and in particular, to a storage management method, an electronic device, and a computer program product.

RELATED ART

In the field of storage technologies, snapshots are widely used for data backup. Snapshots can be created on many objects. These objects can be referred to as basic storage objects, such as a Logic Unit Number (LUN), a file system, and a database. With the development of storage technologies, functions for realizing migration of basic storage objects continue to increase. For example, such a migration function can migrate a block storage resource such as a LUN across storage pools or within the same storage pool. However, conventional storage technologies cannot migrate snapshots with their basic storage objects, resulting in low storage management efficiency.

SUMMARY

Embodiments of the present disclosure provide a storage management method, an electronic device, and a computer program product.

According to a first aspect of the present disclosure, a storage management method is provided. The method includes: acquiring a first source snapshot for a source storage object stored in a source storage device; determining first difference data between the first source snapshot and the source storage object or a second source snapshot for the source storage object, creation time of the first source snapshot being associated with creation time of the second source snapshot; and sending the first difference data to a destination storage device to enable the destination storage device to create a first destination snapshot for a destination storage object stored in the destination storage device based on the first difference data.

According to a second aspect of the present disclosure, an electronic device is provided. The device includes at least one processing unit and at least one memory. The at least one memory is coupled to the at least one processing unit and stores an instruction utilized to be executed by the at least one processing unit. The instruction, when executed by the at least one processing unit, causes the device to perform actions, and the actions include: acquiring a first source snapshot for a source storage object stored in a source storage device; determining first difference data between the first source snapshot and the source storage object or a second source snapshot for the source storage object, creation time of the first source snapshot being associated with creation time of the second source snapshot; and sending the first difference data to a destination storage device to enable the destination storage device to create a first destination snapshot for a destination storage object stored in the destination storage device based on the first difference data.

According to a third aspect of the present disclosure, a computer program product is provided. The computer program product is tangibly stored on a non-transient computer-readable medium and includes a machine-executable instruction. The machine-executable instruction, when executed, causes a machine to perform actions, and the actions include: acquiring a first source snapshot for a source storage object stored in a source storage device; determining first difference data between the first source snapshot and the source storage object or a second source snapshot for the source storage object, creation time of the first source snapshot being associated with creation time of the second source snapshot; and sending the first difference data to a destination storage device to enable the destination storage device to create a first destination snapshot for a destination storage object stored in the destination storage device based on the first difference data.

The summary is provided in order to introduce the selection of concepts in a simplified form, which will be further described in the detailed description below. The summary is neither intended to identify key features or essential features of the present disclosure, nor intended to limit the scope of the present disclosure.

BRIEF DESCRIPTION OF THE DRAWINGS

The above and other objectives, features and advantages of the present disclosure will become more apparent by describing example embodiments thereof in more detail with reference to the accompanying drawings, and in the example embodiments of the present disclosure, the same reference numerals generally represent the same components.

In the various drawings, identical or corresponding numerals represent identical or corresponding parts.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although the drawings illustrate the preferred embodiments of the present disclosure, it should be understood that the present disclosure may be implemented in various forms and should not be limited to the embodiments illustrated herein. Rather, these embodiments are provided to make the present disclosure more thorough and complete, and will fully convey the scope of the present disclosure to those skilled in the art.

The terms "include" and variants thereof as used herein represent open-ended inclusion, i.e., "including but not limited to." Unless specifically stated, the term "or" means "and/or." The term "based on" means "based at least in part on." The terms "one example embodiment" and "one embodiment" mean "at least one example embodiment." The term "another embodiment" means "at least one additional embodiment." The terms "first," "second," etc. may refer to different or identical objects. Other explicit and implicit definitions may be included below.

As described above, a conventional storage technology cannot migrate a snapshot together with its basic storage object. Some functions can migrate an attribute of a snapshot together with its basic storage object. However, due to some performance issues, such a function can only migrate an attribute such as a snapshot schedule, but cannot migrate the snapshot with its basic storage object, leading to a considerable limitation. In addition, in the case of migrating a snapshot with its basic storage object, since redundant data may exist in the snapshot, full replication of the snapshot will reduce the system performance.

According to an example embodiment of the present disclosure, an improved solution for storage management is provided. In this solution, a source storage device acquires a source snapshot (hereinafter referred to as "first source snapshot") for a source storage object stored in the source storage device, and determines difference data (hereinafter referred to as "first difference data") between the first source snapshot and a source storage object or another source snapshot (hereinafter referred to as "second source snapshot") for the source storage object. The creation time of the first source snapshot is associated with the creation time of the second source snapshot. Then, the source storage device sends the first difference data to a destination storage device to enable the destination storage device to create a destination snapshot (hereinafter referred to as "first destination snapshot") for a destination storage object stored in the destination storage device based on the first difference data.

Thus, this solution can migrate the snapshot from the source storage device to the destination storage device together with its basic storage object. In addition, by using the difference data, this solution can create a complete copy of the snapshot at the destination storage device when only a small amount of data is transmitted. Therefore, this solution can improve the efficiency and reliability of storage management and provide better user experience.

Figure 1:
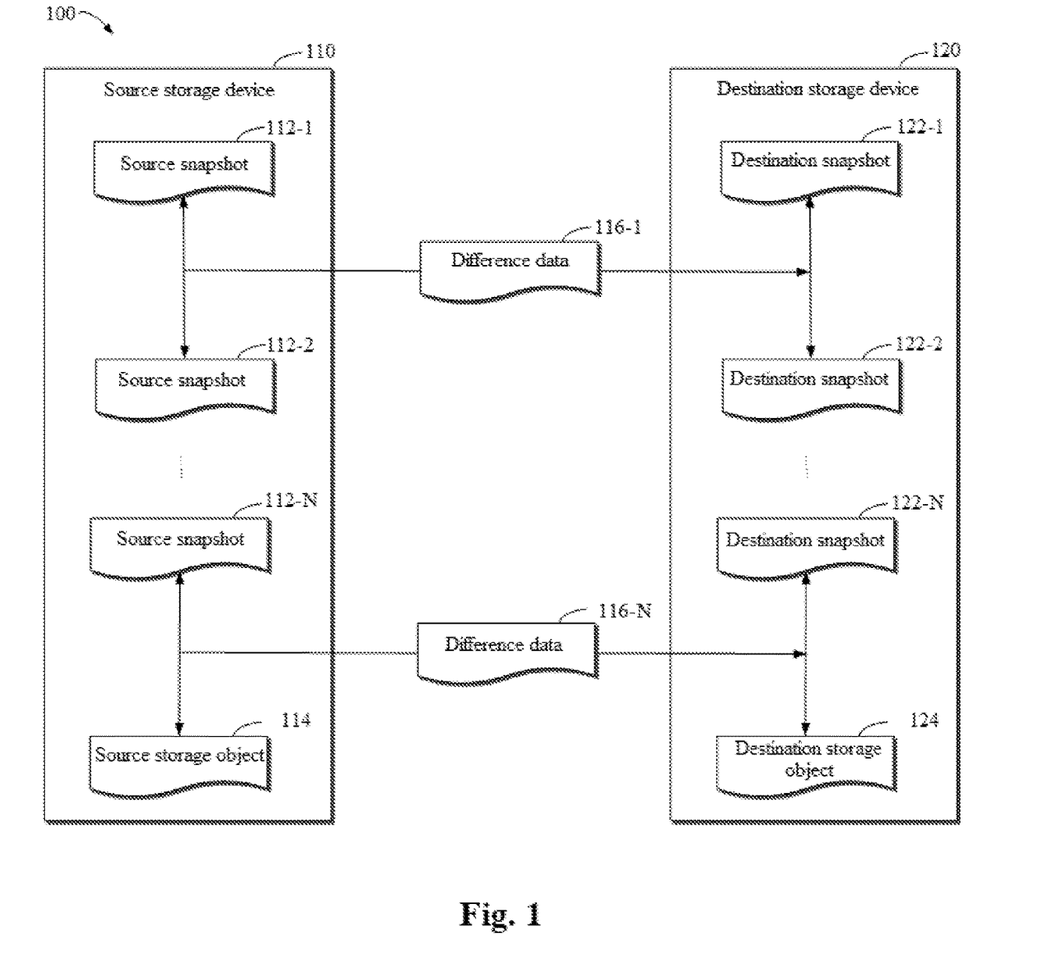
FIG. 1 is a schematic diagram illustrating an example of a storage management environment according to some embodiments of the present disclosure.

In the following, the specific examples of this solution will be described in more detail with reference to FIG. 1 to FIG. 5. FIG. 1 is a schematic diagram illustrating an example of storage management environment 100 according to some embodiments of the present disclosure. Storage management environment 100 includes source storage device 110 and destination storage device 120 for storing snapshots and storage objects. Source storage device 110 and destination storage device 120 may include, but are not limited to, any devices with storage and computation capacities, such as a mainframe computer, a data protection server, an edge computing node, a personal computer, a desktop computer, a laptop computer, a tablet computer, and a personal digital assistant.

As shown in FIG. 1, source storage device 110 stores an active storage object 114 and source snapshot 112-1 to source snapshot 112-N (hereinafter collectively referred to as "source snapshot 112"), while destination storage device 120 stores destination storage object 124 and destination snapshot 122-1 to destination snapshot 122-N (hereinafter collectively referred to as "destination snapshot 122"). Destination storage object 124 and destination snapshot 122-1 to destination snapshot 122-N may be copies of source storage object 114 and source snapshot 112-1 to source snapshot 112-N, respectively, for data backup.

These copies stored in destination storage device 120 may be created based on source storage object 114 and source snapshot 112. Specifically, in order to create these copies, the source storage device 110 may determine difference data (for example, difference data 116-1 to difference data 116-N (hereinafter collectively referred to as "difference data" 116)) between source snapshot 112 and source storage object 114 or another source snapshot 112, and send the difference data to destination storage device 120. Destination storage device 120 may create destination snapshot 122 for destination storage object 124 based on received difference data 116.

Figure 2:
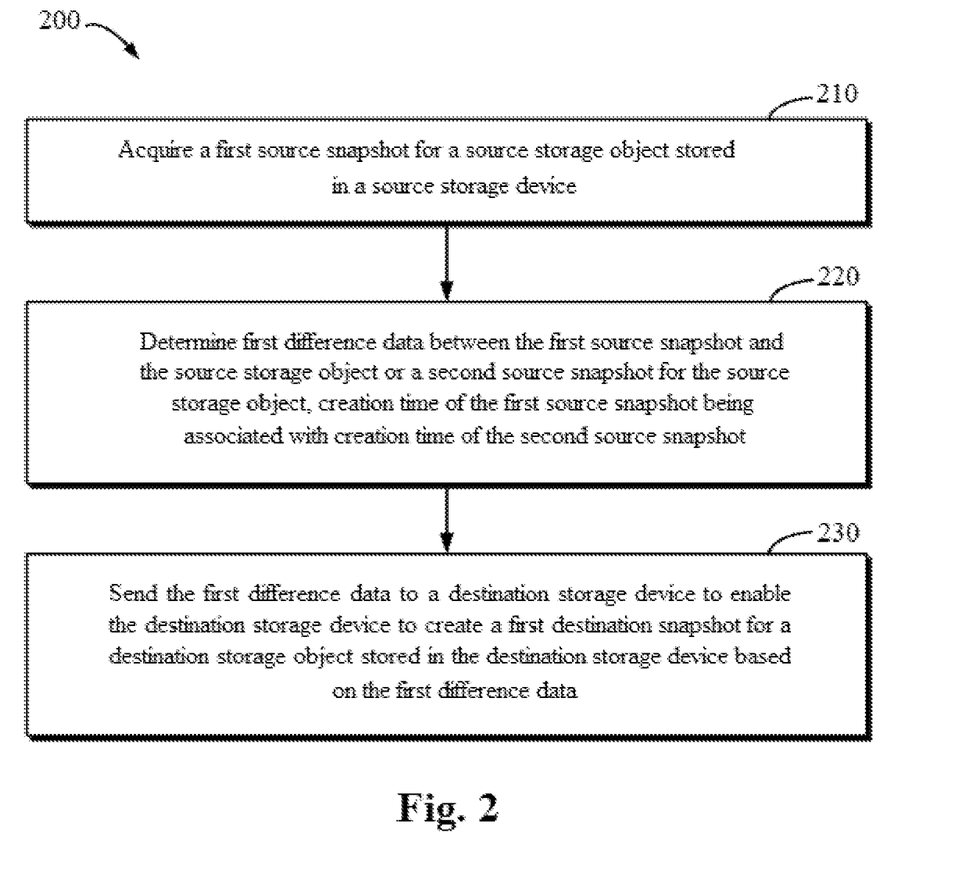
FIG. 2 is a flow chart illustrating a storage management method according to some embodiments of the present disclosure.
Figure 3:
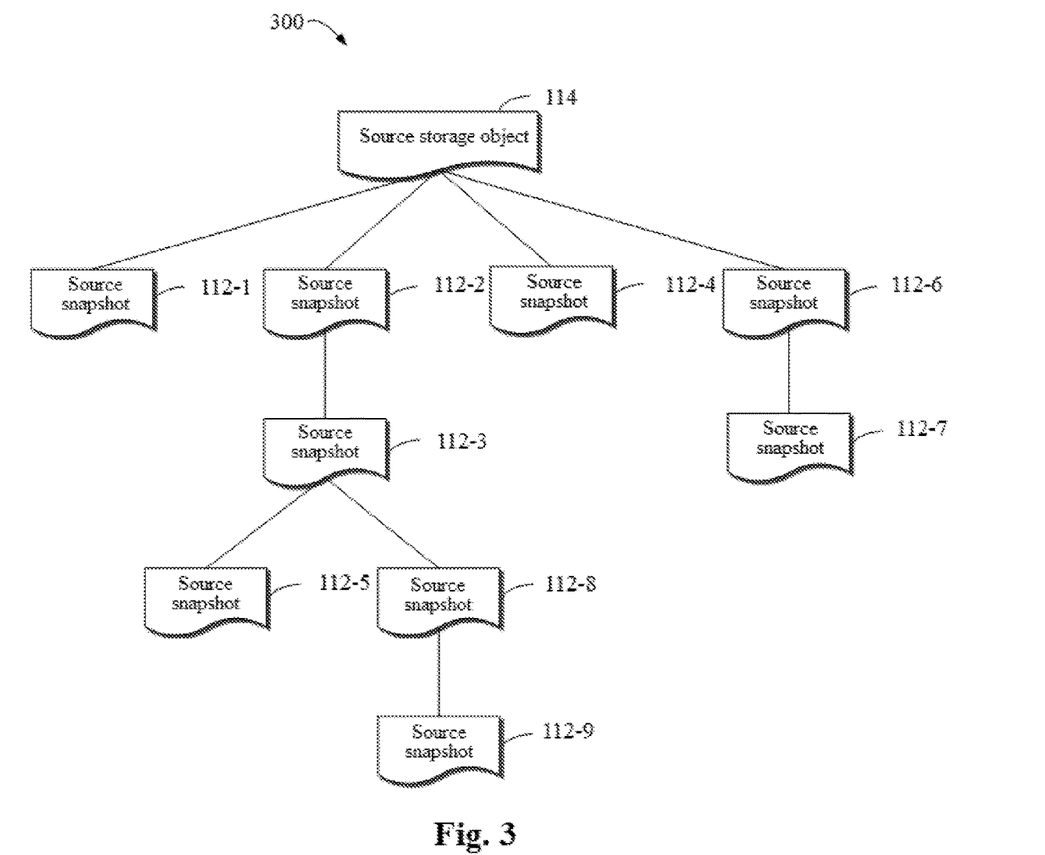
FIG. 3 is an example illustrating a dendritic structure of a snapshot according to some embodiments of the present disclosure.

In the following, a storage management operation performed by source storage device 110 will be described with reference to FIG. 2 to FIG. 4. FIG. 2 is a flow chart illustrating storage management method 200 according to some embodiments of the present disclosure. Method 200 may be implemented, for example, at source storage device 110 as shown in FIG. 1. Alternatively, method 200 may also be implemented at an external computing device in communication with source storage device 110. In addition, the roles of source storage device 110 and destination storage device 120 are interchangeable, that is, destination storage device 120 may also perform the storage management operation of source storage device 110, and vice versa. For ease of discussion, method 200 will be described below with reference to FIG. 1. It should be understood that method 200 may further include additional steps not shown and/or omit steps shown, and the scope of the present disclosure is not limited in this regard.

At 210, source storage device 110 acquires first source snapshot 112 for source storage object 114 stored in source storage device 110. In some embodiments, source storage device 110 may determine whether the first source snapshot is to be copied to destination storage device 120. For example, in the process of migrating source snapshot 112 together with its source storage object 114, after source storage object 114 is copied into destination storage device 120, source storage device 110 may determine whether there is first source snapshot 112 with no copy created in destination storage device 120, and this first source snapshot 112 needs to be copied to destination storage device 120. When first source snapshot 112 is to be copied into destination storage device 120, source storage device 110 may acquire to-be-acquired first source snapshot 112.

At 220, source storage device 110 determines first difference data 116 between first source snapshot 112 and source storage object 114 or second source snapshot 112 for source storage object 114. In some embodiments, source storage device 110 may determine whether the creation time of first source snapshot 112 is later than a predetermined time point. For example, whether first source snapshot 112 is a source snapshot created based on source storage object 114 and having the latest creation time is determined. When the creation time of first source snapshot 112 is later than the predetermined time point, source storage device 110 may determine first difference data 116 between first source snapshot 112 and source storage object 114.

For example, as shown in FIG. 1, it is assumed that source snapshot 112-N needs to be copied to destination storage device 120, and is the source snapshot having the latest creation time. In this case, source storage device 110 may determine difference data 116-N between source snapshot 112-N and source storage object 114.

When the creation time of first source snapshot 112 is earlier than the predetermined time point, source storage device 110 may acquire second source snapshot 112. The creation time of first source snapshot 112 is associated with the creation time of second source snapshot 112. In some embodiments, the creation time of second source snapshot 112 is later than the creation time of first source snapshot 112. For example, second source snapshot 112 may be created immediately after the creation of first source snapshot 112. In this case, source storage device 110 may determine first difference data 116 between first source snapshot 112 and second source snapshot 112.

For example, as shown in FIG. 1, it is assumed that source snapshot 112-1 needs to be copied to destination storage device 120, and is not the source snapshot having the latest creation time. In this case, source storage device 110 may acquire source snapshot 112-2 created immediately after the creation of source snapshot 112-1, and determine difference data 116-1 between source snapshot 112-1 and source snapshot 112-2.

At 230, source storage device 110 sends first difference data 116 to destination storage device 120 to enable destination storage device 120 to create first destination snapshot 122 for destination storage object 124 stored in destination storage device 120 based on first difference data 116. As described above, destination storage object 124 is a copy of source storage object 114 in destination storage device 120. The created first destination snapshot 122 is also a copy of first source snapshot 112 in destination storage device 120. In this way, source snapshot 112 may be migrated together with its source storage object 114 to destination storage device 120.

Further, as described above, first difference data 116 may be determined in two ways. On one hand, in some embodiments, when first difference data 116 are determined based on first source snapshot 112 and source storage object 114, in addition to first difference data 116, source storage device 110 may further send an identifier of source storage object 114 to destination storage device 120 to instruct destination storage device 120 to create first destination snapshot 122 based on first difference data 116 and destination storage object 124 corresponding to the identifier of source storage object 114.

For example, in addition to difference data 116-N, source storage device 110 may further send the identifier of source storage object 114 to destination storage device 120 to instruct destination storage device 120 to create first destination snapshot 122-N based on difference data 116-N and destination storage object 124 corresponding to the identifier of source storage object 114.

Alternatively, even if source storage device 110 does not send the identifier of source storage object 114 to destination storage device 120, destination storage device 120 may determine that first difference data 116 aims at destination storage object 124 and to-be-created first destination snapshot 122 based on destination storage object 124 that has been stored on the destination storage device, so that first destination snapshot 122 may be created based on first difference data 116 and destination storage object 124. For example, upon receiving difference data 116-N, destination storage device 120 may create destination snapshot 122-N based on difference data 116-N and destination storage object 124.

On the other hand, in some embodiments, when first difference data 116 is determined based on first source snapshot 112 and second source snapshot 112, in addition to first difference data 116, source storage device 110 may further send an identifier of second source snapshot 112 to destination storage device 120 to instruct destination storage device 120 to create first destination snapshot 122 based on first difference data 116 and second destination snapshot 122 corresponding to the identifier of second source snapshot 112.

For example, in addition to difference data 116-1, source storage device 110 may further send the identifier of source snapshot 112-2 to destination storage device 120 to instruct destination storage device 120 to create destination snapshot 122-1 based on difference data 116-1 and destination snapshot 122-2 corresponding to the identifier of source snapshot 112-2.

Alternatively, even if source storage device 110 does not send the identifier of second source snapshot 112 to destination storage device 120, destination storage device 120 may also determine that first difference data 116 aims at second destination snapshot 122 and to-be-created first destination snapshot 122 based on second destination snapshot 122 that has been stored on destination storage device, so that first destination snapshot 122 may be created based on first difference data 116 and second destination snapshot 122. For example, upon receiving difference data 116-1, destination storage device 120 may create destination snapshot 122-1 based on difference data 116-1 and destination snapshot 122-2.

Source storage device 110 may repeatedly determine difference data 116 in the manner described above and provide the difference data to destination storage device 120 for re-creating the snapshot until source storage device 110 does not include a snapshot to be migrated to destination storage device 110.

Therefore, this solution may create a complete snapshot copy at the destination storage device, and may also use the difference data to achieve a relatively small network overhead. Therefore, the efficiency and reliability of storage management may be improved, and the cost of storage management may be reduced, thereby providing better user experience.

It should be understood that storage objects and snapshots may be stored in various structures. In some embodiments, the storage objects and the snapshots may be stored in a dendritic structure. FIG. 3 is an example illustrating dendritic structure 300 (interchangeably referred to as "snapshot tree") of a snapshot according to some embodiments of the present disclosure. As shown in FIG. 3, source storage object 114 is a root node of snapshot tree 300. Source snapshot 112-1, source snapshot 112-2, source snapshot 112-4, and source snapshot 112-6 are connected to source storage object 114 serving as the root node. Source snapshot 112-3 is connected to source snapshot 112-2 serving as an intermediate node. Source snapshot 112-5 and source snapshot 112-8 are connected to source snapshot 112-3 serving as an intermediate node. Source snapshot 112-9 is connected to source snapshot 112-8 serving as an intermediate node. In addition, source snapshot 112-7 is connected to source snapshot 112-6 serving as an intermediate node.

Figure 4:
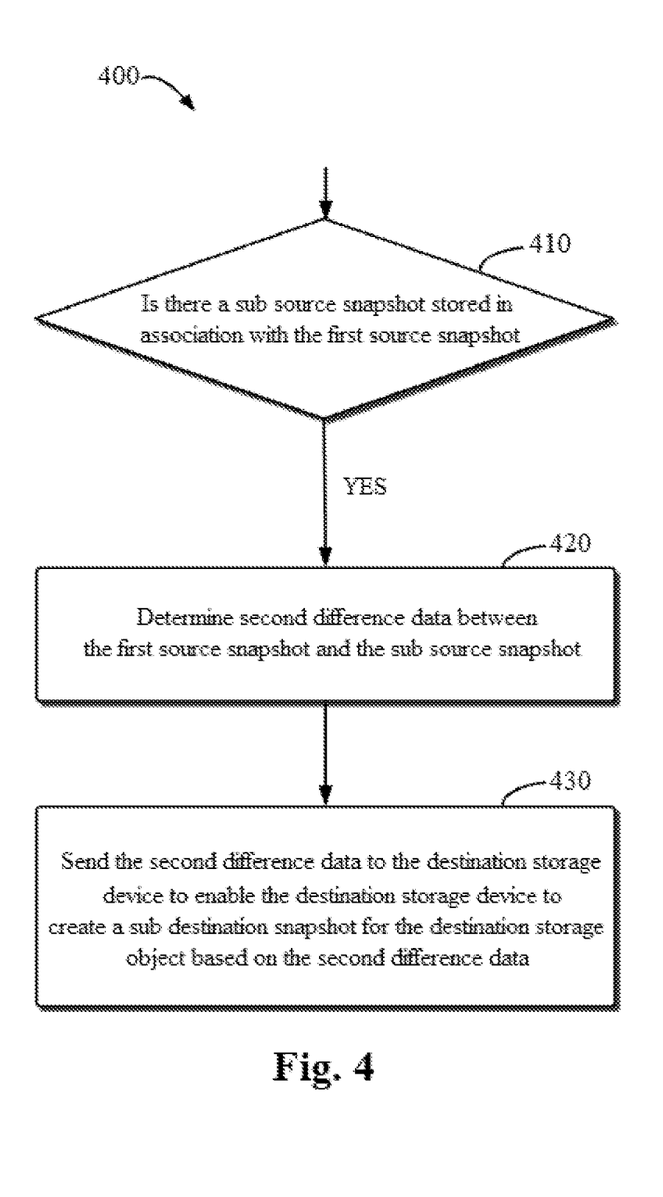
FIG. 4 is a flow chart illustrating a method for migrating a sub snapshot according to some embodiments of the present disclosure.

For this dendritic structure, FIG. 4 is a flow chart illustrating method 400 for migrating a sub snapshot according to some embodiments of the present disclosure. Method 400 may be implemented, for example, at source storage device 110 as shown in FIG. 1. Alternatively, method 400 may also be implemented at an external computing device in communication with source storage device 110. In addition, the roles of source storage device 110 and destination storage device 120 are interchangeable, that is, destination storage device 120 may also perform the storage management operation of source storage device 110, and vice versa. For ease of discussion, method 400 will be described below with reference to FIG. 3. It should be understood that method 400 may further include additional steps not shown and/or omit steps shown, and the scope of the present disclosure is not limited in this regard.

When source storage object 114 and source snapshot 112 are stored in the dendritic structure, after difference data 116 for first source snapshot 112 is determined and sent to destination storage device 120, at 410, source storage device 110 may determine whether there is sub source snapshot 112 stored in association with first source snapshot 112 based on the dendritic structure. For example, after source snapshot 112-6 is processed, source storage device 110 may determine whether there is sub source snapshot 112 stored in association with source snapshot 112-6.

When it is determined that there is sub source snapshot 112, at 420, source storage device 110 may determine difference data (hereinafter referred to as "second difference data") between first source snapshot 112 and sub source snapshot 112. As shown in FIG. 3, source snapshot 112-6 has sub source snapshot 112-7, so source storage device 110 may determine the difference data between source snapshot 112-6 and sub source snapshot 112-7.

At 430, source storage device 110 may send the second difference data to destination storage device 120 to enable destination storage device 120 to create sub destination snapshot 122 for destination storage object 124 based on the second difference data. For example, source storage device 110 may send the difference data between source snapshot 112-6 and sub source snapshot 112-7 to destination storage device 120 to enable destination storage device 120 to create sub destination snapshot 122-7 based on the difference data.

In addition to the second difference data, source storage device 110 may further send an identifier of first source snapshot 112 to destination storage device 120 to instruct destination storage device 120 to create sub destination snapshot 122 based on the second difference data and first destination snapshot 122 corresponding to the identifier of first source snapshot 112. For example, in addition to the difference data between source snapshot 112-6 and sub source snapshot 112-7, source storage device 110 may also send the identifier of source snapshot 112-6 to destination storage device 120 to instruct destination storage device 120 to create sub destination snapshot 122-7 based on the difference data and destination snapshot 122-6 corresponding to the identifier of source snapshot 112-6.

Alternatively, even if source storage device 110 does not send the identifier of first source snapshot 112 to destination storage device 120, destination storage device 120 may also determine that the second difference data aims at first destination snapshot 122 and to-be-created sub destination snapshot 122 based on first destination snapshot 122 that has been stored on the destination storage device, so that sub destination snapshot 122 may be created based on the second difference data and first destination snapshot 122. For example, upon receiving the difference data between source snapshot 112-6 and sub source snapshot 112-7, destination storage device 120 may create sub destination snapshot 122-7 based on the difference data and destination snapshot 122-6.

Source storage device 110 may use various algorithms to traverse snapshot tree 300, so as to migrate source snapshot 112. For example, when source storage device 110 uses a breadth-first algorithm, the processing order of source snapshot 112 is source snapshot 112-6, source snapshot 112-7, source snapshot 112-4, source snapshot 112-2, source snapshot 112-3, source snapshot 112-8, source snapshot 112-9, source snapshot 112-5, and source snapshot 112-1. Correspondingly, destination storage device 120 also creates a copy of snapshot tree 300 in this order and structure.

Thus, when the storage objects and the snapshots are stored in a dendritic structure, this solution can easily and efficiently migrate the snapshots together with their basic storage objects from the source storage device to the destination storage device.

Figure 5:
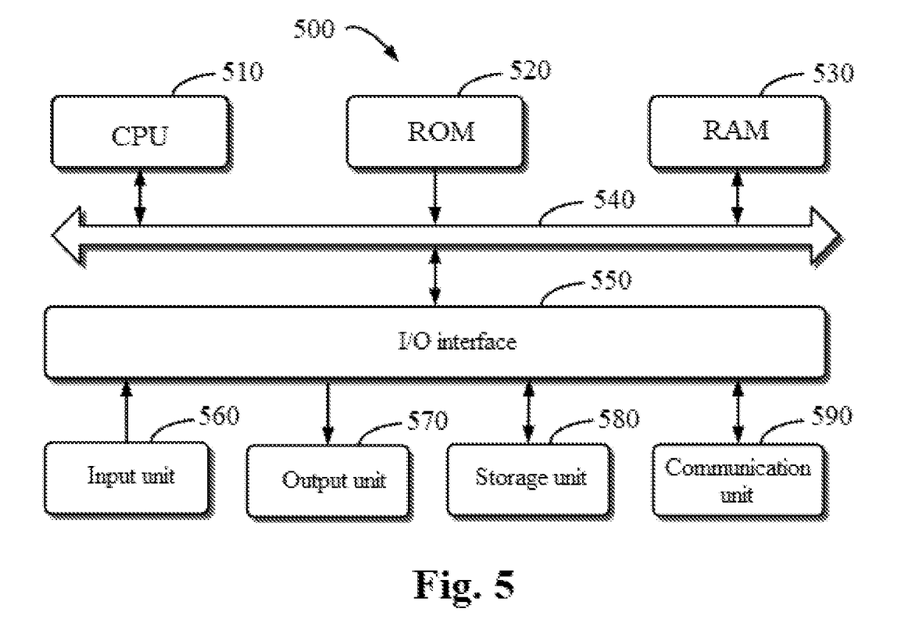
FIG. 5 is a schematic block diagram illustrating an example device for implementing the embodiments of the content of the present disclosure.

FIG. 5 is a schematic block diagram illustrating example device 500 for implementing the embodiments of the content of the present disclosure. For example, source storage device 110 shown in FIG. 1 may be implemented by device 500. As shown in the figure, device 500 includes central processing unit (CPU) 510 that may perform various appropriate actions and processing according to a computer program instruction stored in a read-only memory (ROM) 520 or a computer program instruction loaded from a storage unit 580 into a random access memory (RAM) 530. In RAM 530, various programs and data required for the operation of storage device 500 may also be stored. CPU 510, ROM 520 and RAM 530 are connected to each other through bus 540. Input/output (I/O) interface 550 is also connected to bus 540.

Multiple components in device 500 are connected to I/O interface 550, including: input unit 560, such as a keyboard or a mouse; output unit 570, such as various types of displays or speakers; storage unit 580, such as a magnetic disk or an optical disk; and communication unit 590, such as a network card, a modem, or a wireless communication transceiver. Communication unit 590 allows device 500 to exchange information/data with other devices over a computer network such as the Internet and/or various telecommunication networks.

The various processes and processing described above, such as method 200 or method 400, may be performed by processing unit 510. For example, in some embodiments, method 200 or method 400 may be implemented as a computer software program that is tangibly included in a machine-readable medium, such as storage unit 580. In some embodiments, some or all of the computer program may be loaded and/or installed onto device 500 via ROM 520 and/or communication unit 590. When the computer program is loaded into RAM 530 and executed by CPU 510, one or more actions of method 200 or method 400 described above may be executed.

The present disclosure may be a method, an apparatus, a system, and/or a computer program product. The computer program product may include a computer-readable storage medium having computer-readable program instructions for performing various aspects of the present disclosure.

The computer-readable storage medium may be a tangible device that may retain and store instructions used by an instruction execution device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disk read-only memory (CD-ROM), a digital versatile disk (DVD), a memory stick, a floppy disk, a mechanically encoded device such as punch cards or raised structures in a groove having instructions recorded thereon, and any suitable combination of the foregoing. The computer-readable storage medium as used herein is not to be interpreted as a transient signal itself, such as a radio wave or other freely propagating electromagnetic waves, an electromagnetic wave propagating through a waveguide or other transmission media (e.g., a light pulse through a fiber optic cable), or an electrical signal transmitted through an electrical wire.

The computer-readable program instructions described herein may be downloaded from the computer-readable storage medium to various computing/processing devices or downloaded to an external computer or an external storage device over a network, such as the Internet, a local area network (LAN), a wide area network (WAN), and/or a wireless network. The network may include copper transmission cables, fiber optic transmissions, wireless transmissions, routers, firewalls, switches, gateway computers, and/or edge servers. A network adapter card or network interface in each computing/processing device receives a computer-readable program instruction from the network and forwards the computer-readable program instruction for storage in the computer-readable storage medium in each computing/processing device.

The computer program instructions for performing the operations of the present disclosure may be assembly instructions, instruction set architecture (ISA) instructions, machine instructions, machine-related instructions, microcodes, firmware instructions, state setting data, or source codes or object codes written in any combination of one or more programming languages, including object-oriented programming languages such as Smalltalk or C++, as well as conventional procedural programming languages such as the "C" language or similar programming languages. The computer-readable program instructions may be executed entirely on a user computer, executed partly on a user computer, executed as a stand-alone software package, executed partly on a user computer while executed partly on a remote computer, or executed entirely on a remote computer or a server. In the case of a remote computer, the remote computer may be connected to a user computer through any type of network, including an LAN or a WAN, or may be connected to an external computer (e.g., connected through the Internet using an Internet service provider). In some embodiments, an electronic circuit, such as a programmable logic circuit, a field programmable gate array (FPGA), or a programmable logic array (PLA), may be customized by utilizing state information of the computer-readable program instructions. The electronic circuit may execute the computer-readable program instructions to implement various aspects of the present disclosure.

Various aspects of the present disclosure are described herein with reference to flow charts and/or block diagrams of methods, apparatuses (systems) and computer program products according to embodiments of the present disclosure. It should be understood that each block of the flow charts and/or block diagrams and combinations of blocks in the flow charts and/or block diagrams can be implemented by computer-readable program instructions.

These computer-readable program instructions may be provided to a processing unit of a general purpose computer, a special purpose computer, or other programmable data processing apparatuses, thereby producing a machine such that when these instructions are executed by the processing unit of the computer or other programmable data processing apparatuses, an apparatus of implementing functions/actions specified in one or more blocks in the flow charts and/or the block diagrams is generated. The computer-readable program instructions may also be stored in the computer-readable storage medium. These instructions cause the computer, the programmable data processing apparatuses, and/or other devices to operate in a specific manner, so that the computer-readable medium storing the instructions includes an article of manufacture that includes instructions for implementing various aspects of functions/actions specified in one or more blocks in the flow charts and/or the block diagrams.

The computer-readable program instructions may also be loaded onto the computer, other programmable data processing apparatuses, or other devices to perform a series of operational steps on the computer, other programmable data processing apparatuses, or other devices to produce a computer-implemented process. Thus, instructions executed on the computer, other programmable data processing apparatuses, or other devices implement functions/actions specified in one or more blocks in the flow charts and/or the block diagrams.

The flow charts and the block diagrams in the drawings illustrate possible implementations of system architectures, functions and operations of the system, the method, and the computer program product according to various embodiments of the present disclosure. In this regard, each block in the flow charts or the block diagrams may represent a part of a module, a program segment or an instruction, and the part of the module, the program segment or the instruction includes one or more executable instructions for realizing a specified logic function. Functions marked in the blocks may also happen in an order different from that marked in the accompanying drawings in some alternative implementations. For example, actually, two successive blocks may be basically concurrently executed and may also be executed according to an opposite order sometimes, which is decided by the related functions. It should also be noted that each block in the block diagrams and/or the flow charts as well as a combination of the blocks in the block diagrams and/or the flow charts may be realized by using a special and hardware-based system used for executing specified functions or actions or may be realized by using a combination of special hardware and a computer instruction.

The various embodiments of the present disclosure have been described above. The foregoing description is an example, not exhaustive, and is not intended to be limited to the disclosed embodiments. Multiple modifications and variations will be apparent to those skilled in the art without departing from the scope and spirit of the various illustrated embodiments. The terms used herein were chosen to best explain the principles and practical applications of the embodiments, or improvements on technologies in the marketplace or to enable others of ordinary skill in the art to understand the embodiments disclosed herein.

The invention claimed is:

1. A storage management method, comprising:
   receiving a request to copy a first source snapshot to the destination storage device, the first source snapshot having a latest creation time of all source snapshots of a set of source snapshots to be copied for the source storage object;
   in response to receiving the request to copy the first source snapshot, acquiring the first source snapshot for a source storage object stored in a source storage device;
   determining first difference data between the first source snapshot and the source storage object or a second source snapshot for the source storage object, creation time of the first source snapshot being associated with creation time of the second source snapshot, wherein determining the first difference data includes calculating, in response to acquiring the first source snapshot, the first difference data between the first source snapshot and the source storage object;
   sending the first difference data to a destination storage device to enable the destination storage device to create a first destination snapshot for a destination storage object stored in the destination storage device based on the first difference data; and
   creating, as a copy of the first source snapshot and based on the first difference data and the destination storage object, the first destination snapshot.

2. The method according to claim 1, wherein the step of acquiring the first source snapshot comprises:
   determining whether the first source snapshot is to be copied into the destination storage device; and
   acquiring the first source snapshot in response to determining that the first source snapshot is to be copied into the destination storage device.

3. The method according to claim 1, wherein the step of determining the first difference data comprises:
   determining whether the creation time of the first source snapshot is later than a predetermined time point; and
   determining the first difference data between the first source snapshot and the source storage object in response to determining that the creation time of the first source snapshot is later than the predetermined time point.

4. The method according to claim 3, further comprising:
   acquiring a second source snapshot in response to determining that the creation time of a third source snapshot of the set of source snapshots is earlier than the predetermined time point, the creation time of the second source snapshot being later than the creation time of the third source snapshot; and
   determining second difference data between the third source snapshot and the second source snapshot.

5. The method according to claim 1, wherein the first difference data is determined based on the first source snapshot and the source storage object, and the method further comprises:
   sending an identifier of the source storage object to the destination storage device to instruct the destination storage device to create the first destination snapshot based on the first difference data and the destination storage object corresponding to the identifier of the source storage object.

6. The method according to claim 1, wherein second difference data is determined based on a third source snapshot of the set of source snapshots and the second source snapshot, and the method further comprises:
   sending an identifier of the second source snapshot to the destination storage device to instruct the destination storage device to create a third destination snapshot based on the second difference data and a second destination snapshot corresponding to the identifier of the second source snapshot.

7. The method according to claim 1, wherein the snapshot for the source storage object is stored in a dendritic structure, and the method further comprises:
   based on the dendritic structure, determining whether a sub source snapshot stored in association with the first source snapshot exists;
   determining second difference data between the first source snapshot and the sub source snapshot in response to determining that the sub source snapshot exists; and
   sending the second difference data to the destination storage device to enable the destination storage device to create a sub destination snapshot for the destination storage object based on the second difference data.

8. The method according to claim 1, wherein acquiring the first source snapshot includes choosing the first source snapshot from a plurality of source snapshots for the source storage object; and
   wherein the method further comprises:
      making, based on creation times of the plurality of source snapshots, a selection between at least: (i) the source storage object and (ii) a second source snapshot; and
   wherein determining first difference data includes:
      calculating, as the first difference data and in response to choosing the first source snapshot, differences between (i) data corresponding to the first source snapshot and (ii) data corresponding to the selection.

9. The method according to claim 1, wherein acquiring the first source snapshot includes:
   retrieving the first source snapshot according to a processing order of source snapshots to be copied to the destination storage device, the processing order being based on a storage structure of the source snapshots; and
   wherein determining the first difference data including calculating the first difference data based on a position of the first source snapshot in the storage structure relative to the source storage object.

10. An electronic device, comprising:
   at least one processing unit;
   at least one memory, the at least one memory being coupled to the at least one processing unit and storing a set of instructions utilized to be executed by the at least one processing unit, wherein the set of instructions, when executed by the at least one processing unit, causes the device to perform actions, and the actions comprise:
      receiving a request to copy a first source snapshot to the destination storage device, the first source snapshot having a latest creation time of all source snapshots of a set of source snapshots to be copied for the source storage object;

in response to receiving the request to copy the first source snapshot, acquiring the first source snapshot for a source storage object stored in a source storage device;

determining first difference data between the first source snapshot and the source storage object or a second source snapshot for the source storage object, creation time of the first source snapshot being associated with creation time of the second source snapshot, wherein determining the first difference data includes calculating, in response to acquiring the first source snapshot, the first difference data between the first source snapshot and the source storage object;

sending the first difference data to a destination storage device to enable the destination storage device to create a first destination snapshot for a destination storage object stored in the destination storage device based on the first difference data; and creating, as a copy of the first source snapshot and based on the first difference data and the destination storage object, the first destination snapshot.

11. The device according to claim 10, wherein the action of acquiring the first source snapshot comprises:

determining whether the first source snapshot is to be copied into the destination storage device; and acquiring the first source snapshot in response to determining that the first source snapshot is to be copied into the destination storage device.

12. The device according to claim 10, wherein the action of determining the first difference data comprises:

determining whether the creation time of the first source snapshot is later than a predetermined time point; and determining the first difference data between the first source snapshot and the source storage object in response to determining that the creation time of the first source snapshot is later than the predetermined time point.

13. The device according to claim 12, wherein the actions further comprise:

acquiring a second source snapshot in response to determining that the creation time of a third source snapshot of the set of source snapshots is earlier than the predetermined time point, the creation time of the second source snapshot being later than the creation time of the third source snapshot; and determining second difference data between the third source snapshot and the second source snapshot.

14. The device according to claim 10, wherein the first difference data is determined based on the first source snapshot and the source storage object, and the method further comprises:

sending an identifier of the source storage object to the destination storage device to instruct the destination storage device to create the first destination snapshot based on the first difference data and the destination storage object corresponding to the identifier of the source storage object.

15. The device according to claim 10, wherein second difference data is determined based on a third source snapshot of the set of source snapshots and the second source snapshot, and the method further comprises:

sending an identifier of the second source snapshot to the destination storage device to instruct the destination storage device to create a third destination snapshot based on the second difference data and a second destination snapshot corresponding to the identifier of the second source snapshot.

16. The device according to claim 10, wherein the snapshot for the source storage object is stored in a dendritic structure, and the method further comprises:

based on the dendritic structure, determining whether a sub source snapshot stored in association with the first source snapshot exists;

determining second difference data between the first source snapshot and the sub source snapshot in response to determining that the sub source snapshot exists; and sending the second difference data to the destination storage device to enable the destination storage device to create a sub destination snapshot for the destination storage object based on the second difference data.

17. A computer program product having a non-transitory computer readable medium which stores a set of instructions to perform storage management; the set of instructions, when carried out by computerized circuitry, causing the computerized circuitry to perform a method of:

receiving a request to copy the first source snapshot to the destination storage device, the first source snapshot having a latest creation time of all source snapshots of a set of source snapshots to be copied for the source storage object;

in response to receiving the request to copy the first source snapshot, acquiring a first source snapshot for a source storage object stored in a source storage device;

determining first difference data between the first source snapshot and the source storage object or a second source snapshot for the source storage object, creation time of the first source snapshot being associated with creation time of the second source snapshot, wherein determining the first difference data includes calculating, in response to acquiring the first source snapshot, the first difference data between the first source snapshot and the source storage object;

sending the first difference data to a destination storage device to enable the destination storage device to create a first destination snapshot for a destination storage object stored in the destination storage device based on the first difference data; and creating, as a copy of the first source snapshot and based on the first difference data and the destination storage object, the first destination snapshot.

\* \* \* \* \*